United States Patent [19]

Schirmer

[11] Patent Number: 4,761,080
[45] Date of Patent: Aug. 2, 1988

[54] MULTILAYER GUSSETED BAG WITH REVERSE FIN SEALS

[75] Inventor: Henry G. Schirmer, Spartanburg, S.C.

[73] Assignee: W. R. Grace & Co., Cryovac Div., Duncan, S.C.

[21] Appl. No.: 518,781

[22] Filed: Jul. 29, 1983

[51] Int. Cl.$^4$ .............................................. B65D 30/20
[52] U.S. Cl. .................................. 383/120; 206/524.2; 383/114
[58] Field of Search ............... 383/120, 122, 109, 113, 383/114; 206/524.2, 524.3, 524.9, 524.1; 229/3.1

[56] References Cited

U.S. PATENT DOCUMENTS

| | | |
|---|---|---|
| 146,435 | 1/1874 | Crowell ................................ 383/122 |
| 775,268 | 11/1904 | Flowers ............................... 383/122 |
| 2,162,258 | 6/1939 | Hultin ................................. 383/122 |
| 2,443,484 | 6/1948 | Van Sickels ....................... 229/87.5 |
| 2,961,063 | 11/1960 | Fesco .................................. 383/120 |
| 3,276,670 | 10/1966 | Harvey ............................... 383/120 |
| 3,485,145 | 12/1969 | Jones . | |
| 3,491,522 | 1/1970 | Fesco .................................. 383/120 |
| 3,596,443 | 8/1971 | Goldberg ............................ 383/120 |
| 3,741,253 | 6/1973 | Brax et al. . | |
| 3,955,749 | 5/1976 | Turkenkopf ....................... 383/122 |
| 4,085,244 | 4/1978 | Stillman ............................. 206/524.2 |
| 4,247,584 | 1/1981 | Widiger et al. ................... 206/524.2 |
| 4,386,124 | 5/1983 | Akao ................................... 206/524.2 |
| 4,407,874 | 10/1983 | Gehrke .......................... 206/524.2 X |

Primary Examiner—Stephen Marcus
Assistant Examiner—Bryon Gehman
Attorney, Agent, or Firm—John J. Toney; William D. Lee, Jr.; Jennifer L. Skord

[57] ABSTRACT

A gusseted bag is provided which, according to a preferred mode, is constructed of thermoplastic multilayer film with an outer sealing layer and has a seamless folded bottom and reverse-fin-sealed sides. Advantageously, the starting material for such bags is lay-flat tubular film cut longitudinally along the center of one side, which is folded and joined to itself along each side of the longitudinal cut, respectively. In an alternate mode wherein the bag bottom is not seamless but is end-sealed, the bag is constructed by joining together two such lay-flat tubes along each side of their longitudinal cuts, respectively.

1 Claim, 2 Drawing Sheets

MULTILAYER GUSSETED BAG WITH REVERSE FIN SEALS

BACKGROUND OF THE INVENTION

This invention relates generally to a gusseted bag of packaging material and specifically to a side-gusseted bag of thermoplastic tubular film.

It is conventional to make bags from tubular theromoplastic film. Tubular film is made by coextruding a multilayer film by the conventional blown bubble method. The nascent extruded tube is then cooled, collapsed, and fed through a hot water bath where the tube is sufficiently softened so that it can be stretch-oriented by the trapped bubble technique. The oriented bubble is then cooled, collapsed, and wound up as lay-flat, seamless tubular film to be used later to make bags. For example, end-seal bags are typically made in series by transversely heat sealing across the width of lay-flat tubing at regular intervals followed by severing the tubing so that the transverse seal forms the bag bottom and the collapsed edges of the tubing form the bag sides.

In certain packaging applications, it is desirable to utilize gusseted bags, for example bags having a gusset fold extending down each side. It is commercially advantageous to make gusset folds directly on seamless tubing in the bag making operation discussed above. For example, U.S. Pat. No. 3,485,145 for "Apparatus for Forming Gusseted Tubing" issued Dec. 23, 1969 to Jones discloses apparatus for producing gusset folds in a moving length of plastic tubing. A gusset former rides inside a bubble of advancing tubing and acts in cooperation with external guides to form a pair of gusset folds along diametrically opposed sides of the tubing.

Certain deficiencies have been observed in bags made from gusset-folded tubular film. It is difficult to produce a dead fold at the inside fold of a gusset on plastic film, which tends to hinder achieving uniformity in gusseted bag production. Another problem concerns integrity of the end-seal forming the bottom of such bags, particularly when made of heat shrinkable (oriented) film. Since the gusset folds extend to the bag bottom, the end heat seal tends to be irregular where the heat seal extends across the gusset folds. When using oriented film and upon heat shrinkage of the bag about a contained product, shrink tension tends to break the end seal.

It is therefore a primary object of the invention to provide a gusseted bag of thermoplastic film, especially tubular film, which has side gussets incorporating a dead fold. It is a secondary object to provide such a bag that incorporates a seamless bag bottom.

SUMMARY OF THE INVENTION

Accordingly, there is provided in a gusseted bag having gusset folds along its sides, the improvement comprising reverse-fin-seals at the interior folds of said gusset folds. Preferably, the bag further comprises a seamless bag bottom formed along a transverse fold between the front and rear panels of the bag.

In a preferred embodiment having a seamless bag bottom, the bag comprises a length of lay-flat tubular film having a longitudinal cut along one face and being folded across its width onto itself toward said cut face, the fold forming said seamless bottom, and being longitudinally sealed to itself along each side of said cut, respectively, to form said reverse-fin-seals. Preferably, the reverse-fin-seals are heat seals further provided that one surface layer of said film has a low heat sealing temperature range, relative to that of its other surface layer, and which is on the outside of the bag.

In another embodiment wherein the bag bottom is not seamless but is end-sealed, the bag comprises two lengths of lay-flat tubular film, each having a longitudinal cut along the center of one face, which are joined together along each side of said cuts with their longitudinal cuts confronting, respectively, to form said reverse-fin-seals. In one mode where the outside surface layer of the tubular film has a low heat sealing temperature relative to that of the inside surface layer, the reverse-fin-seals preferably comprise heat seals. Alternatively where the inside surface layer of the tubular film has a relatively low heat sealing temperature, the reverse-fin-seals comprise adhesive seals.

Additionally, there is provided in a method for making a gusseted bag with side gusset folds, the improvement comprising forming the interior folds of said gusset folds with reverse-fin-seals.

In one mode for making side-gusseted bags having a seamless bottom, the method comprises providing a planar film having its sides inwardly and symmetrical folded along the length of the film; folding said film across its width so as to confront the folded sides, respectively; and then longitudinally joining the confronting edges of the folded sides of said film, respectively, to form said reverse-fin-seals. Preferably, said film is provided by longitudinally cutting one side of a lay-flat tubular film along its center. Preferably, said reverse-fin-seals are formed by heat sealing provided that the outside surface layer of said tubular film has a low heat sealing temperature relative to that of its inside surface layer.

Advantageously, the method is practiced continuously in making a series of gusseted bags from tubular film by advancing a lay-flat tube of multilayer thermoplastic film having an outer surface layer of a low heat sealing temperature range relative to that of its inner surface layer; longitudinally cutting one side of said lay-flat tube along its center; periodically folding back the leading segment of said advancing lay-flat tube onto its longitudinally cut surface; and longitudinally heat sealing the thus folded segment along each side of the longitudinal cut; followed by severing the folded segment from said advancing lay-flat tube.

In another mode for making bags having an end-sealed bottom, the method comprises providing two lengths of lay-flat tubular film, each having a longitudinal cut along the center one face; aligning and longitudinally joining the cut faces of said lengths of lay-flat film along each side of said cuts, respectively, to form the reverse-fin-seals; and transversely joining said lengths of lay-flat film at one end to form the bottom of said bag. Preferably, the method is practiced repetitively in a continuous process utilizing two advancing lay-flat tubes of indefinite length. In one mode where the outside surface layer of the tubular film has a low heat sealing temperature relative to that of the inside surface layer, the reverse-fin-seals preferably comprise heat seals. Alternatively where the inside surface layer of the tubular film has a relatively low heat sealing temperature, the reverse-fin-seals comprise adhesive seals.

BRIEF DESCRIPTION OF THE DRAWINGS

Further details are given below with reference to the drawings wherein.

DESCRIPTION OF THE PREFERRED EMBODIMENTS

Figure 1:
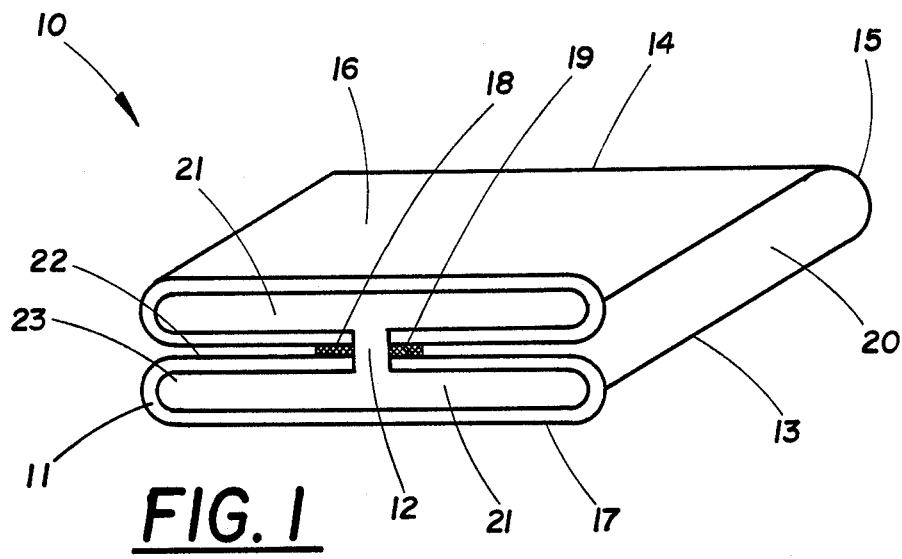
FIG. 1 is a perspective view of a gusseted plastic bag made in accordance with the present invention and utilizing lay-flat tubing having a longitudinal cut along one side.

In FIG. 1, there is shown a gusseted bag 10 made in accordance with the invention. The bag is made from a seamless tube of thermoplastic multilayer film 11 collapsed to a lay-flat configuration and having a longitudinal slit 12 along one face. The section of lay-flat tubing has a length equal to about twice the desired bag length 13 and a lay-flat width about equal to the desired bag width 14. The lay-flat tubing is folded across its width at 14 to a double lay-flat configuration so that the longitudinally slit face of the tubing is folded into itself, thereby forming an internal channel 12 and a seamless bag bottom 15. The uncut face of the lay-flat tubing in the folded configuration forms upper bag panel 16 and lower bag panel 17. Next, longitudinal heat seals are formed along both sides of longitudinal cut 12 as indicated at 18 and 19. It is a required feature of this embodiment of the invention that the multilayer film 11 of which the tubular film is composed has an outer sealing layer, i.e., the outer surface layer 22 of the tubing has a heat sealing or softening temperature range that is substantially less than the softening temperature range of the inner surface layer 23 of the tubing. By forming longitudinal heat seals 18 and 19 gusseted sides 20 are formed, thereby delimiting an expandable product containing envelope 21. Heat seals 18 and 19 form the interior fold of the W-folded side gussets, respectively, while the outer folds of the gusset folds are formed by the collapsed edges of the lay-flat tubing. A key advantage of this configuration is that heat seals 18 and 19 form a dead fold, i.e. the side gussets do not tend to relax. The requirement that the inside surface layer of multilayer film 11 be of a much higher softening temperature than outer surface layer 22 is that upon longitudinally pressing the bag between heat sealing jaws in forming gusset seals 18 and 19 the interior surface of envelope 21 does not fuse. The configuration at seals 18 and 19 is referred to as a "reverse-fin-seal". In conventional plastic bag making utilizing a fin seal, the fin thus formed normally extends toward the outside of the bag.

Figure 2A:
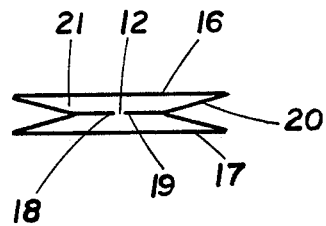
FIGS. 2A and 2B schematically show an end view of the collapsed and expanded bag mouth, respectively.
Figure 2B:
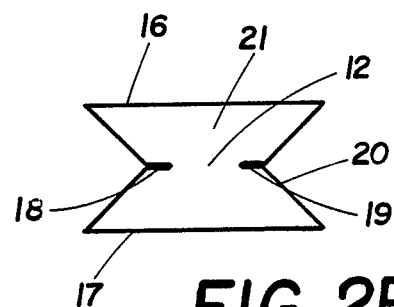

In FIGS. 2A and 2B, there are shown, respectively, closed and opened views of the bag mouth. As shown, as unused bag will be substantially in a lay-flat configuration. In use, bag panels 16 and 17 are pulled apart, thereby expanding envelope 21 by extension of gusseted sides 20 which expand from reverse-fin-seals 18 and 19. It is noted that upon fully extending gusseted sides 20, envelope 21 will expand to about twice that of the original width 14 of the lay-flat tubing 14. The bag bottom is seamless thereby eliminating any problems in end-sealing across the gusset folds when using oriented, heat-shrinkable film.

Figure 3:
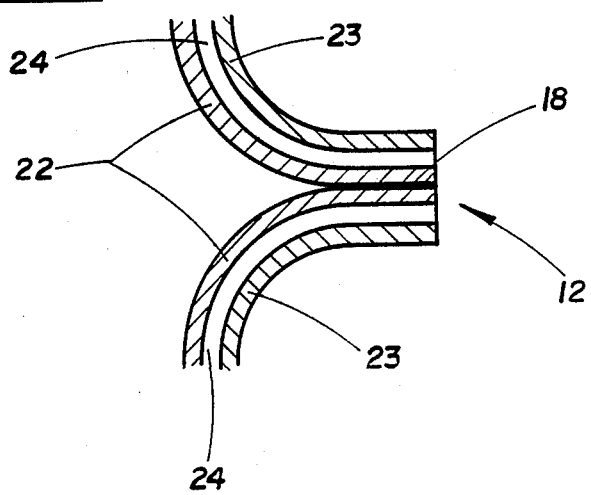
FIG. 3 is a schematic cross-section of a reverse-fin-seal incorporated in the gusset folds of the foregoing bag.

In FIG. 3, there is shown a detailed schematic view, in cross-section, of the multilayer film making up the bag 10 in the vicinity of reverse-fin-seal 18. In the three-layer example shown, outer sealing layer 22 is fused at heat seal 18. Inner layer 23, having a softening temperature substantially greater than that of outer layer 22, is uneffected by heat seal 18. Outer layer 22 is joined to inner layer 23 by an intermediate adhesive layer 24. The film is preferably coextruded tubular film; however, bag 10 may also be formed from sheet film by transversely folding the sides of the sheet toward each other to form longitudinal channel 12, and then proceeding as above from this less preferred starting material. A preferred multilayer structure is (inner) PET/EMA/EVA (outer). The EVA (ethylene-viny acetate copolymer of about 5-20% vinyl acetate content) has a preferred heat sealing temperature of about 300° F., as compared to that of PET (polyethylene terephthalate) of about 500° F. Advantageously, the inside layer is selected to impart relatively high strength to the bag construction. The adhesive interlayer of EMA (ethylene-methyl acrylate) serves to bond the dissimilar surface layers. Preferably, the multilayer film is heat shrinkable (oriented) for vacuum sealing packaging applications. For example, a food product is inserted into expanded envelope 21, then the product is vacuum sealed therein by gathering and clipping the bag mouth under vacuum, and finally the vacumm-closed bag is heat shrunk snuggly about the contained product by immersion of the package in a hot water bath.

Figure 4A:
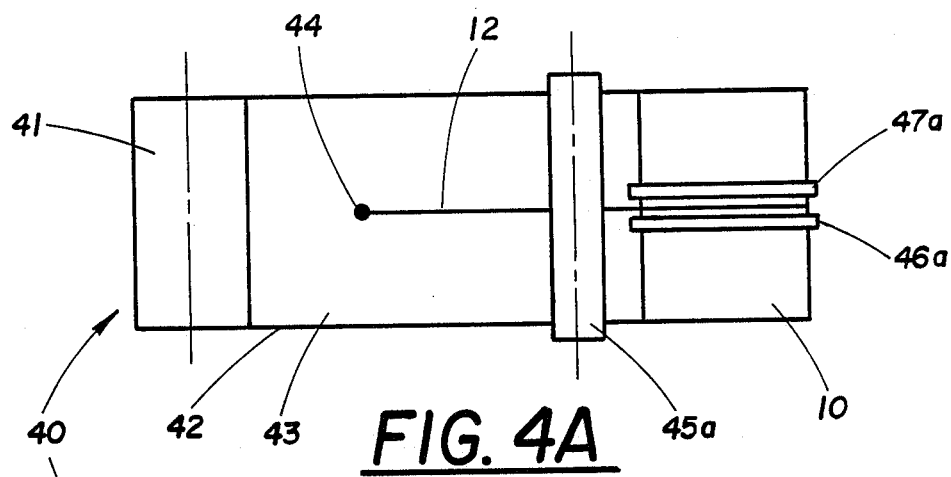
FIGS. 4A and 4B schematically depict a plan and side view, respectively, of a preferred method of making a series of the foregoing bags from lay-flat tubular film.
Figure 4B:
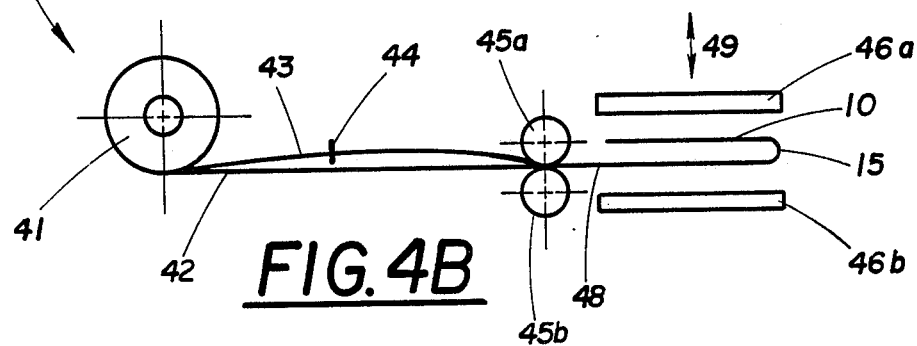

In FIGS. 4A and 4B, there are shown, respectively, plan and side views of a schematic flow chart depicting a preferred method for making the foregoing bags in a continuous operation. The process line 40 begins with the provision of a roll 41 of collapsed lay-flat tubular film which is fed out at 42. The film is advanced by pull rolls 45a,b and is longitudinally cut by conventional cutter 44 along upper face 43 of the lay-flat tubing, thereby forming longitudinal cut 12. After exiting pull rolls 45, the leading segment of the advancing film is folded back onto itself at 15 in a U-folded configuration with the longitudinal cut 12 being on the inside of the fold. The U-folded configuration 10 is then pressed between upper and lower pairs of heat sealing bars 46a,b and 47a,b to form longitudinal heat seals along both sides of cut 12, thereby forming the reverse-fin-seals of the gusseted sides of the bag. Folding of the leading segment 10 is accomplished by a conventional tucking operation (not shown), which preferably is of the type that operates by directing the advancing film across the opening between the opened bars of the heat sealing press and then directing an air jet against the film so as to stuff the film between the heat sealing bars in a U-folded configuration. The thus folding portion of the tubing is then compressed as indicated by arrows 49 between the sealing bars. The folded and heat sealed leading portion is then severed at 48 from the remainder of the advancing tubing, thereby forming a bag such as bag 10 above.

Figure 5:
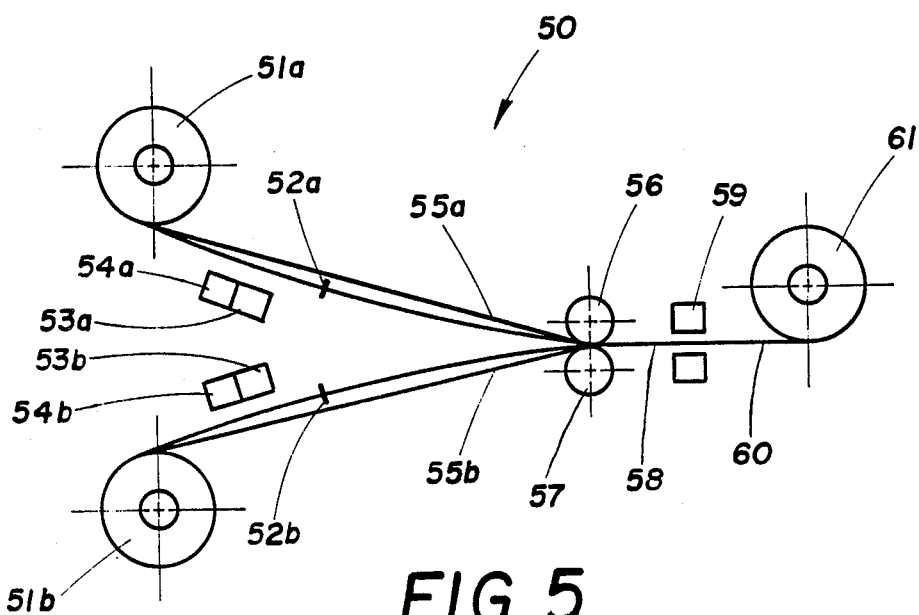
FIG. 5 is a schematic side view of a method for making a series of gusseted bags in an alternate embodiment which is similar to FIG. 1 except for an end-seal.

In FIG. 5, there is shown a schematic side view of a process line for making an alternative embodiment of gusseted bags. Such alternative gusseted bags are similar to the embodiment of FIG. 1 except that such bags incorporate an end seal across the bag bottom at 14 rather than having an end fold 15. In essence, this alternative embodiment of side gusseted bags is formed from two identical sections of lay-flat tubular film each having a longitudinal cut along the center of one face, with the sections being joined together along each side of the longitudinal cuts, respectively. Process line 50 begins with the provision of rolls 51a,b of lay-flat tubular film. As above, the rolls are fed out and a longitudinal cut is made along the center of one face of each lay-flat tube as indicated at cutters 52a,b. According to one mode further discussed below, adhesive is applied along each side of the longitudinal cuts by conventional adhesive applicators 53a,b respectively. Preferably, the film surface in the vicinity of the longitudinal cut is adhesively conditioned by conventional corona discharge units 54a,b. Thus the advancing lay-flat tubes at 55a,b will each have a longitudinal cut along their opposed faces and will have an adhesive coating along narrow strips on either side of the longitudinal cuts, respectively. Press rollers 56 and 57 then press the two tubular films together with their longitudinal cuts aligned so that the lay-flat tubes are joined together by the adhesive strips along each side of the longitudinal cuts respectively. Thus, the joined lay-flat tube configuration upon exiting the press rollers at 58 has formed therein side gussets. The joined tubing then advances through a conventional heat sealer 59 which also has a perforation cutter, whereby end-seals and associated lines of perforation are formed at regular intervals along the advancing joined tubing. At 60 a perforated series of side gusseted bags having end seals results. The advancing series of bags is then accumulated on take-up roll 61.

In this alternative embodiment of side gusseted bags, a multilayer tubular film structure is utilized, according to one variant, that has an inside heat sealing layer such as those films disclosed in U.S. Pat. No. 3,741,253 for "Laminates of Ethylene Vinyl-Acetate Polymers and Polymers of Vinylidene Chloride" issued June 26, 1973 to Brax et al. Representatively, such films have an inside surface layer of irradiatively cross-linked EVA, an interior barrier layer of saran and an outer surface layer of EVA, the tubular film being oriented and heat shrinkable. The inside heat sealing layer configuration facilitates formation of the end heat seals. The side gussets are sealed with a conventional adhesive. Suitable adhesives may be generally characterized as cross-linkable adhesives, e.g. cross-linkable by irradiation, ultraviolet light or a chemical mechanism. Preferred adhesives are urethane adhesives of the type characterized as moisture cross-linkable. Alternatively, adhesive joining at the side-gussets may be accomplished by conventional corona discharge treatment when self-welding film surfaces are being joined.

In another variant where both the side gusset seals and end seals are heat seals, the multi-ply film structure making up the lay-flat tubular film must have an outside surface layer of a relatively low heat sealing temperature range while the inside surface layer must be of a relatively high heat sealing temperature range, for example, the film structure discussed in connection with FIG. 3. In that example, the side gussets, are heat sealed at about 300° F., being the preferred sealing temperature for EVA, then the end heat seals are formed at about 500° F., being the preferred heat sealing temperature for PET.

Although the present invention has been described in conjunction with preferred embodiments, it is to be understood that modifications and variations may be utilized without departing from the principles and scope of the invention, as those skilled in the art will readily understand. Accordingly, such modifications and variations may be practiced within the scope of the following claims:

What is claimed is:

1. A gusseted bag comprising:
   (a) a length of tubular lay-flat film having a longitudinal cut along one face and being folded across its width onto itself toward said cut face, the fold forming a seamless bottom;
   (b) the film having a multi-layer structure comprising PET/EMA/EVA layers, said fold placing the PET layer face-to-face and the EVA layer on the outside of the bag; and,
   (c) longitudinal side seals forming each side of said bag, the side seals being reverse-fin-seals whereby a portion of the EVA layer is in contact with itself along a narrow seam which is heat sealed to close the sides of the bag.

* * * * *